(12) United States Patent
Seung

(10) Patent No.: US 10,913,307 B2
(45) Date of Patent: Feb. 9, 2021

(54) HUBLESS ONE-PIECE WHEEL AND MANUFACTURING METHOD THEREFOR

(71) Applicant: HANDS CORPORATION LTD., Incheon (KR)

(72) Inventor: Hyeon-Chang Seung, Seoul (KR)

(73) Assignee: HANDS CORPORATION LTD.

( * ) Notice: Subject to any disclaimer, the term of this patent is extended or adjusted under 35 U.S.C. 154(b) by 388 days.

(21) Appl. No.: 15/751,404

(22) PCT Filed: May 4, 2016

(86) PCT No.: PCT/KR2016/004683
§ 371 (c)(1),
(2) Date: Apr. 6, 2018

(87) PCT Pub. No.: WO2017/026628
PCT Pub. Date: Feb. 16, 2017

(65) Prior Publication Data
US 2018/0229546 A1 Aug. 16, 2018

(30) Foreign Application Priority Data
Aug. 10, 2015 (KR) .................... 10-2015-0112719

(51) Int. Cl.
*B60B 1/08* (2006.01)
*B22D 18/04* (2006.01)
(Continued)

(52) U.S. Cl.
CPC ............... *B60B 1/08* (2013.01); *B21D 22/14* (2013.01); *B21D 53/26* (2013.01); *B21K 1/34* (2013.01);
(Continued)

(58) Field of Classification Search
CPC ........... B60B 1/08; B60B 3/004; B60B 3/008; B60B 3/02; B60B 3/06; B60B 3/10;
(Continued)

(56) References Cited

U.S. PATENT DOCUMENTS 4,875,518 A * 10/1989 Imura .................... B22C 9/061
164/119
5,248,019 A * 9/1993 Sbarro .................... B60B 3/048
180/219
(Continued)

FOREIGN PATENT DOCUMENTS

KR 10-1998-0018993 A 6/1998
KR 10-2000-0022221 A 4/2000
(Continued)

OTHER PUBLICATIONS

International Search Report (in English and Korean) and Written Opinion (in Korean) issued in PCT/KR2016/004683, dated Aug. 11, 2016; ISA/KR.
(Continued)

*Primary Examiner* — Jason R Bellinger
(74) *Attorney, Agent, or Firm* — Harness, Dickey & Pierce, P.L.C.

(57) ABSTRACT

The present invention relates to a hubless one-piece wheel comprising: a rim; and a disc integrally formed at the rim and formed by low-pressure casting, wherein the disc is a hubless type including a plurality of spokes and a space at the center of the rim. One side of said each spoke is integrally formed at the rim, and a lug hole is formed in the other side of said each spoke for coupling the wheel to a vehicle body. The plurality of spokes are radially arranged inside the rim, and each of the other sides of the spoke locates in the inner center portion of the rim being separated by the space.

2 Claims, 11 Drawing Sheets

(51) Int. Cl.
  *B21D 22/14* (2006.01)
  *B23P 15/00* (2006.01)
  *B21D 53/26* (2006.01)
  *B60B 29/00* (2006.01)
  *B60B 1/06* (2006.01)
  *B60B 19/00* (2006.01)
  *B60B 3/10* (2006.01)
  *B21K 1/34* (2006.01)
  *B22D 31/00* (2006.01)

(52) U.S. Cl.
  CPC ........... *B22D 18/04* (2013.01); *B22D 31/002* (2013.01); *B23P 15/00* (2013.01); *B60B 1/06* (2013.01); *B60B 3/10* (2013.01); *B60B 19/00* (2013.01); *B60B 29/00* (2013.01)

(58) Field of Classification Search
  CPC . B61D 53/26; B21K 1/30; B21K 1/32; B21K 1/34; B22D 15/005; B22D 31/002; B22C 9/28
  See application file for complete search history.

(56) References Cited

U.S. PATENT DOCUMENTS

| | | | |
|---|---|---|---|
| 5,490,719 A * | 2/1996 | Lew | B60B 3/048 301/5.1 |
| 6,234,581 B1 | 5/2001 | Stach | |
| 6,637,828 B2 | 10/2003 | Braunschweiler | |
| 8,113,524 B2 * | 2/2012 | Karpman | A63C 17/016 280/63 |
| 8,464,822 B2 * | 6/2013 | Spector | B62K 3/00 180/181 |
| 8,967,636 B2 * | 3/2015 | Horst | B60B 19/00 280/47.38 |
| 9,440,488 B1 * | 9/2016 | Mothafar | B60B 19/00 |
| 9,573,417 B2 * | 2/2017 | Wang | A63C 17/223 |
| 10,035,376 B2 * | 7/2018 | Stoehr | B60B 33/0028 |
| 10,549,339 B2 * | 2/2020 | Wang | B22D 18/04 |
| 2005/0212350 A1 | 9/2005 | Yamamoto et al. | |
| 2016/0368043 A1 * | 12/2016 | Zhou | B22C 9/28 |
| 2018/0118298 A1 * | 5/2018 | David | B62K 25/04 |

FOREIGN PATENT DOCUMENTS

| | | |
|---|---|---|
| KR | 10-0460655 B1 | 4/2005 |
| KR | 10-2006-0044653 A | 5/2006 |
| KR | 10-2007-0045800 A | 5/2007 |
| KR | 10-2007-0053380 A | 5/2007 |
| KR | 10-2013-0044465 A | 5/2013 |
| KR | 10-2014-0101221 A | 8/2014 |
| KR | 10-1529866 B1 | 6/2015 |

OTHER PUBLICATIONS

Korean Office Action (with English translation) for corresponding Korean Patent Application No. 10-2015-0112719, dated Sep. 29, 2016.

* cited by examiner

S20

| | Conventional one-piece wheel | Hubless one-piece wheel |
|---|---|---|
| Design and structure |  |  |
| Weight (kg) | 11.73 | 11.23(-500g) |
| Weight reduction (%) | 4.26 ||

| Test condition | | Test result | | Evaluation |
|---|---|---|---|---|
| | | Before test | After test | |
| Normal | 540kg |  |  | Pass |
| Extreme (+50 kg) | 590kg |  |  | Pass |
| Extreme (+80 kg) | 620kg |  |  | Pass |

| Test condition | | Test result | | |
|---|---|---|---|---|
| | | Before test | After test | Evaluation |
| Normal | 200,000 cycle | | | Pass |
| Extreme (+100,000 cycle) | 300,000 cycle | | | Pass |
| Extreme (+200,000 cycle) | 400,000 cycle | | | Pass |

*FIG. 10*

| Test condition | | Test result | | Evaluation |
|---|---|---|---|---|
| | | Before test | After test | |
| Normal | 200,000 cycle |  |  | Pass |
| Extreme (+100,000 cycle) | 300,000 cycle |  |  | Pass |

HUBLESS ONE-PIECE WHEEL AND MANUFACTURING METHOD THEREFOR

CROSS-REFERENCE TO RELATED APPLICATION

This application is a U.S. National Phase Application under 35 U.S.C. 371 of International Application No. PCT/KR2016/004683, filed May 4, 2016, which claims priority to Korean Application No. 10-2015-0112719, filed Aug. 10, 2015, both of which are hereby incorporated by reference.

TECHNICAL FIELD

The present invention relates to a hubless one-piece wheel and a manufacturing method therefor. More specifically, the wheel can be lightweight by not having a hub usually being formed thick for assembling the wheel to the axle of a vehicle.

BACKGROUND

The statements in this section merely provide background information related to the present disclosure and do not necessarily constitute prior art.

The present invention relates to a hubless one-piece wheel and a manufacturing method therefor. More specifically, the wheel can be lightweight by not having a hub being formed thick in general for assembling the wheel to the axle of a vehicle. Having no hub enables thinner riser during casting which allows easier cutting of the riser, and saving the amount of the molten metal so that the cost and time of manufacturing are reduced.

In general, a vehicle wheel is secured to an axle through a central portion of the metallic wheel fitted with a rubber tire filled with air or nitrogen. Especially in recent years, an aluminum wheel is preferred as it offers a fine design, better fuel efficiency due to lightweight, and better cooling efficiency.

Typically, the aluminum wheel is secured to an axle through a hub formed at the center of one side of the cylindrically shaped rim over which the tire is fitted.

Also, the chassis component of the vehicle is closely related to the performance of the vehicle, so a variety of research and development are performed to reduce the weight of the chassis components. Typically, 1 kg reduction in the chassis components reduces the load on the vehicle suspension by 15 kg when the vehicle is traveling.

Such research developments as forming a hollow portion in the rim or spoke of the wheel are known from Korean Patent Publication No. 10-1998-018993, Korean Patent Publication No. 10-2000-0022221, Korean Patent Publication No. 10-2006-0044653, and Korean Patent No. 10-0460655.

However, the prior arts to reduce the weight of the wheel, forming a hollow inside the rim or spoke, need to form a cavity to remove the molding sand. Still, removing the molding sand is not an easy task even with the cavity provided.

Further, the prior arts need more time and cost for wheel production as the fabrication tasks are not easy and are done repeatedly using a device configured in a complex structure.

DISCLOSURE

Technical Problem

Thus, the present inventors have developed a hubless one-piece wheel and the manufacturing method therefor to be able to reduce the weight of the wheel while reducing time and cost for fabrication.

The present invention aims to provide a lightweight hubless one-piece wheel and the manufacturing method therefor by not having a hub usually being formed thick for assembling the wheel to the axle of a vehicle body.

In addition, the present invention aims to provide a hubless one-piece wheel and the cost- and time-effective manufacturing method therefor. By not having a hub, the casting can have a thinner riser allowing easier cutting of the riser and can consume less amount of the molten metal.

SUMMARY

To achieve the above objects, the present invention provides a hubless one-piece wheel comprising a rim; and a disc integrally formed at the rim and formed by low-pressure casting, wherein the disc is a hubless type including a plurality of spokes and a space at the center of the rim. One side of said each spoke is integrally formed at the rim, and a lug hole is formed on the other side of said each spoke for coupling the wheel to a vehicle body. The plurality of spokes are radially arranged inside the rim, and each of the other sides of the spoke locates in the inner center portion of the rim being separated by the space.

In addition, the present invention provides a manufacturing method for the hubless one-piece wheel comprising the steps of (a) manufacturing a preform having a wheel shape consisted of a riser, a plurality of spokes integrally formed and radially arranged around the circumference of the riser, and a rim integrally formed and connected to each one side of the plurality of spokes by pouring molten metal stored in a thermally insulated furnace into a low-pressure casting machine; (b) flow-forming a rim of the preform to provide a rim shape of the wheel; (c) disc-cutting the riser of the preform so that a space is formed inside the center of the preform, and each one of the other sides of the spokes located in the central portion of the rim is separated from each other; (d) disc-machining protrusions formed in the other sides of the spokes to round each one of the other sides of the separated spokes; and (e) forming a lug hole at each one of the other sides of the spokes formed in the preform.

According to the manufacturing method for the hubless one-piece wheel of the present invention, a wheel can be lightweight by not having a hub usually being formed thick for assembling the wheel to the axle of a vehicle.

In addition, having no hub enables thinner riser during casting which allows easier cutting of the riser, and saving of the amount of the molten metal so that the cost and time of manufacturing can be reduced in the present invention.

BRIEF DESCRIPTION OF THE DRAWINGS

The drawings described herein are for illustrative purposes only of selected examples and not all possible implementations and are not intended to limit the scope of the present disclosure.

FIG. 10 is a chart of a rotational bending durability test of the wheel of the present invention.

REFERENCE NUMERALS

Figure 1:
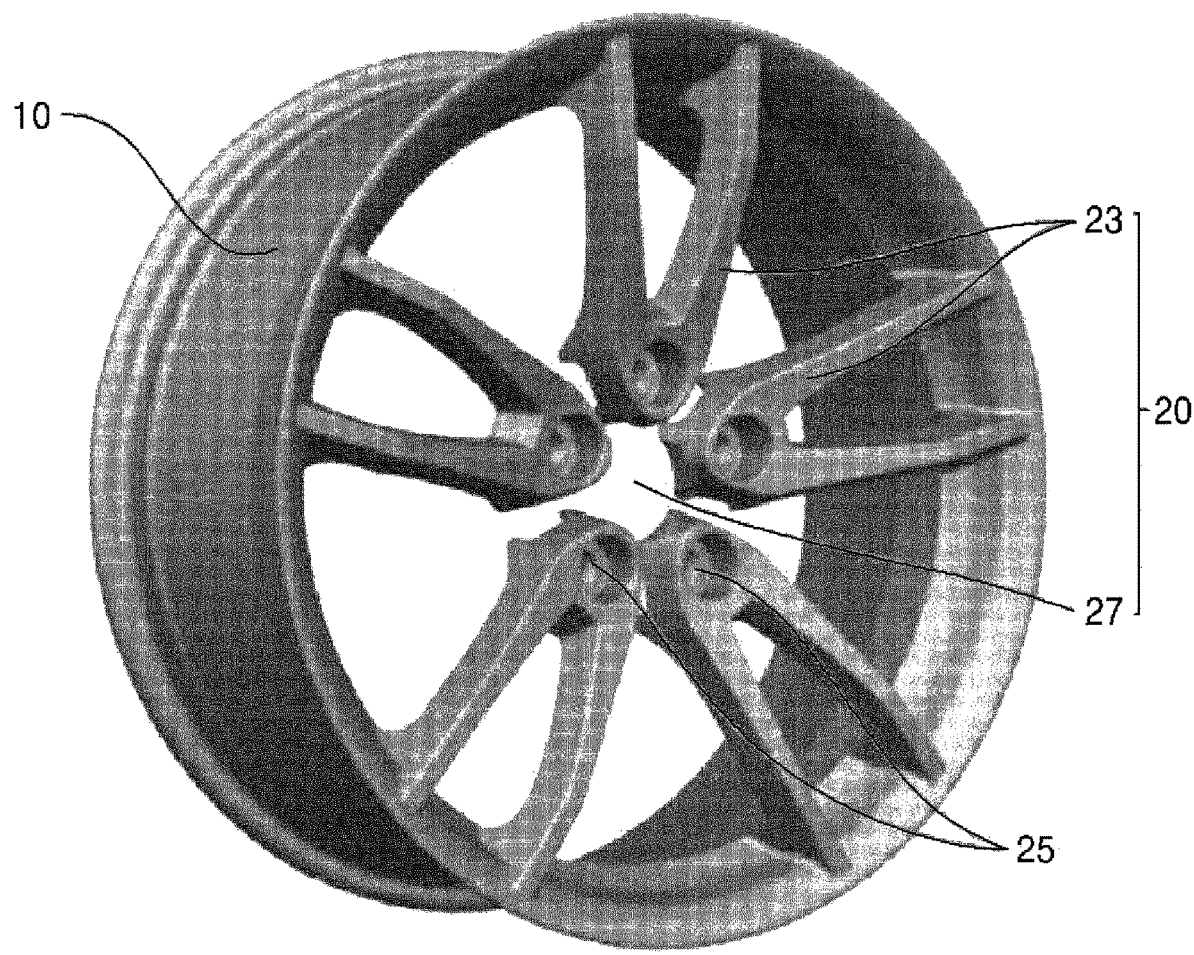
FIG. 1 is a perspective view showing a hubless one-piece wheel of the present invention.
Figure 2:
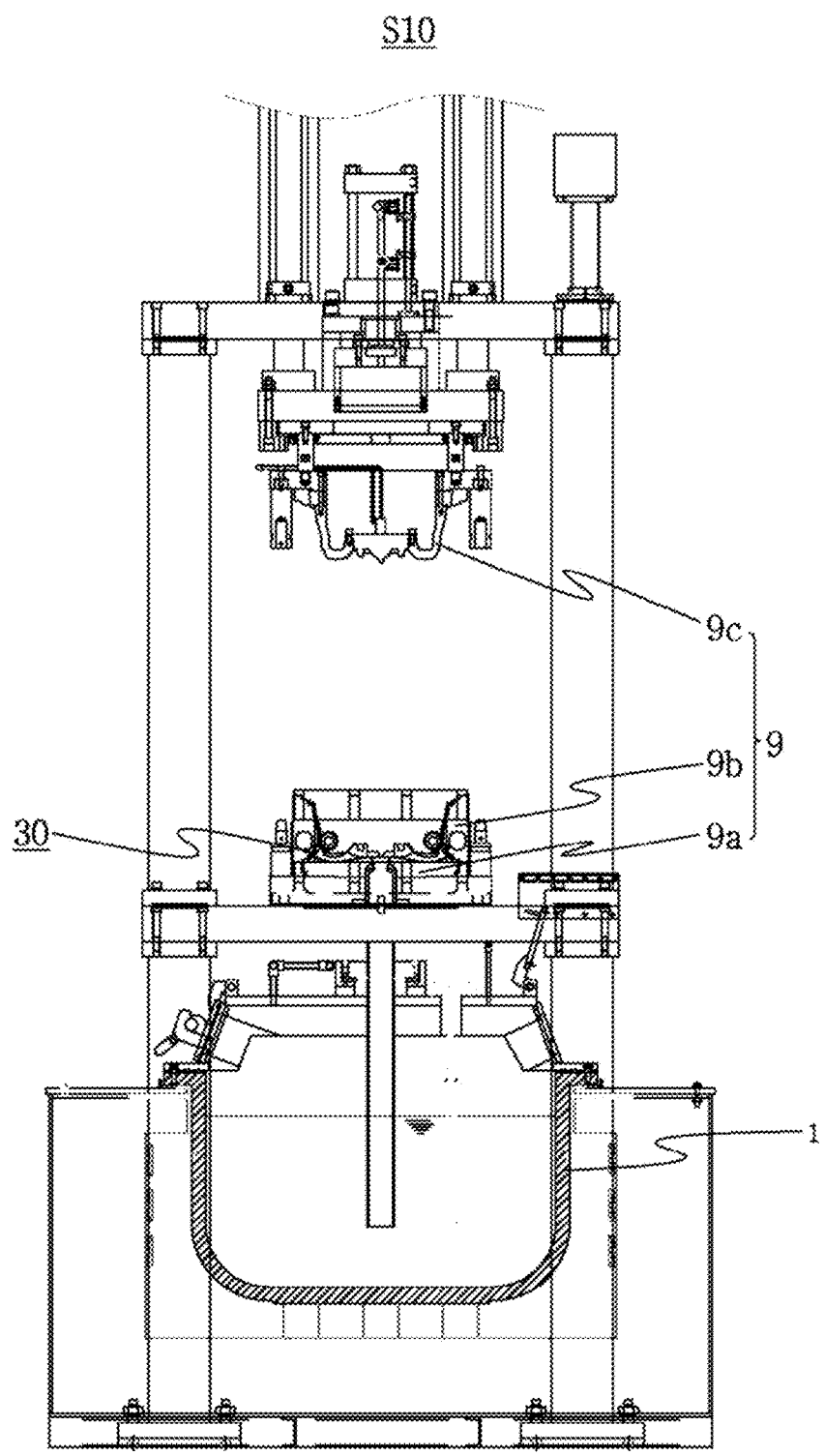
FIG. 2 is a view illustrating the state of manufacturing a preform of the present invention.
Figure 3:
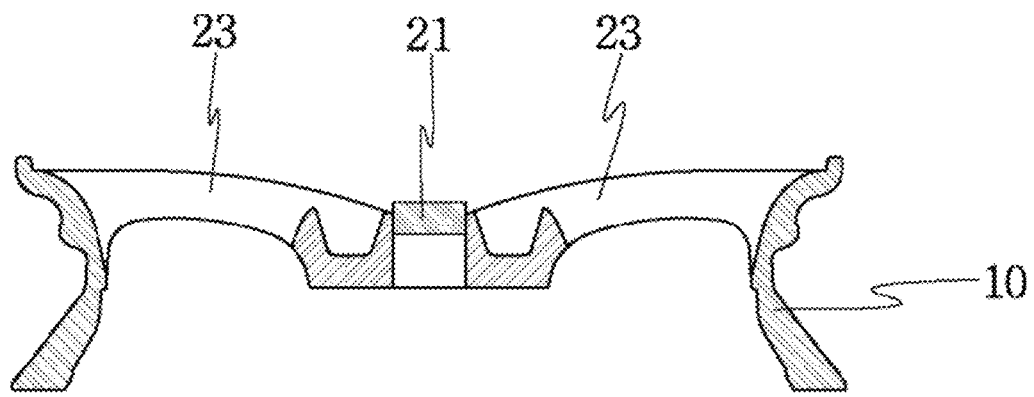
FIG. 3 is a view illustrating the state of flow-forming a rim of the present invention.
Figure 3:
Figure 3:
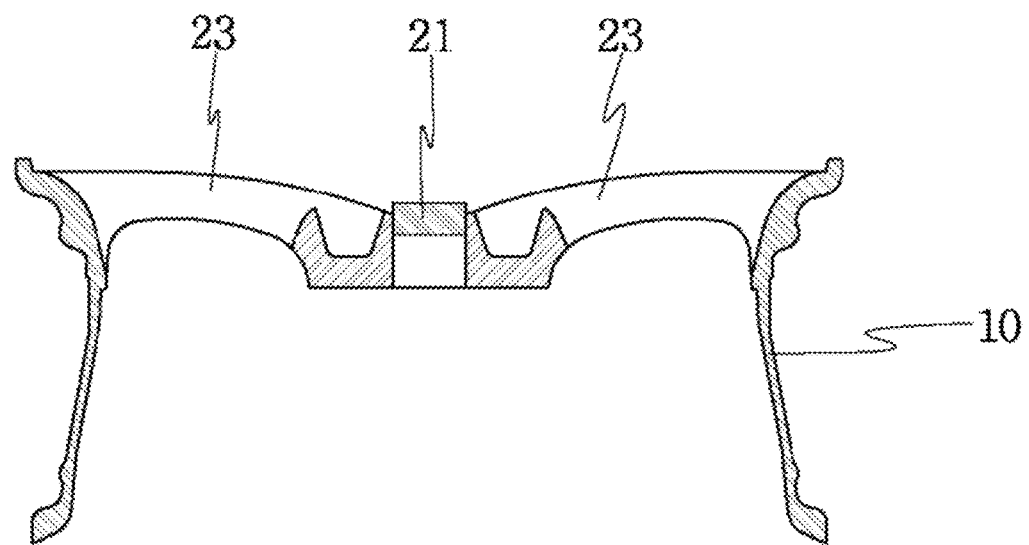
Figure 4:
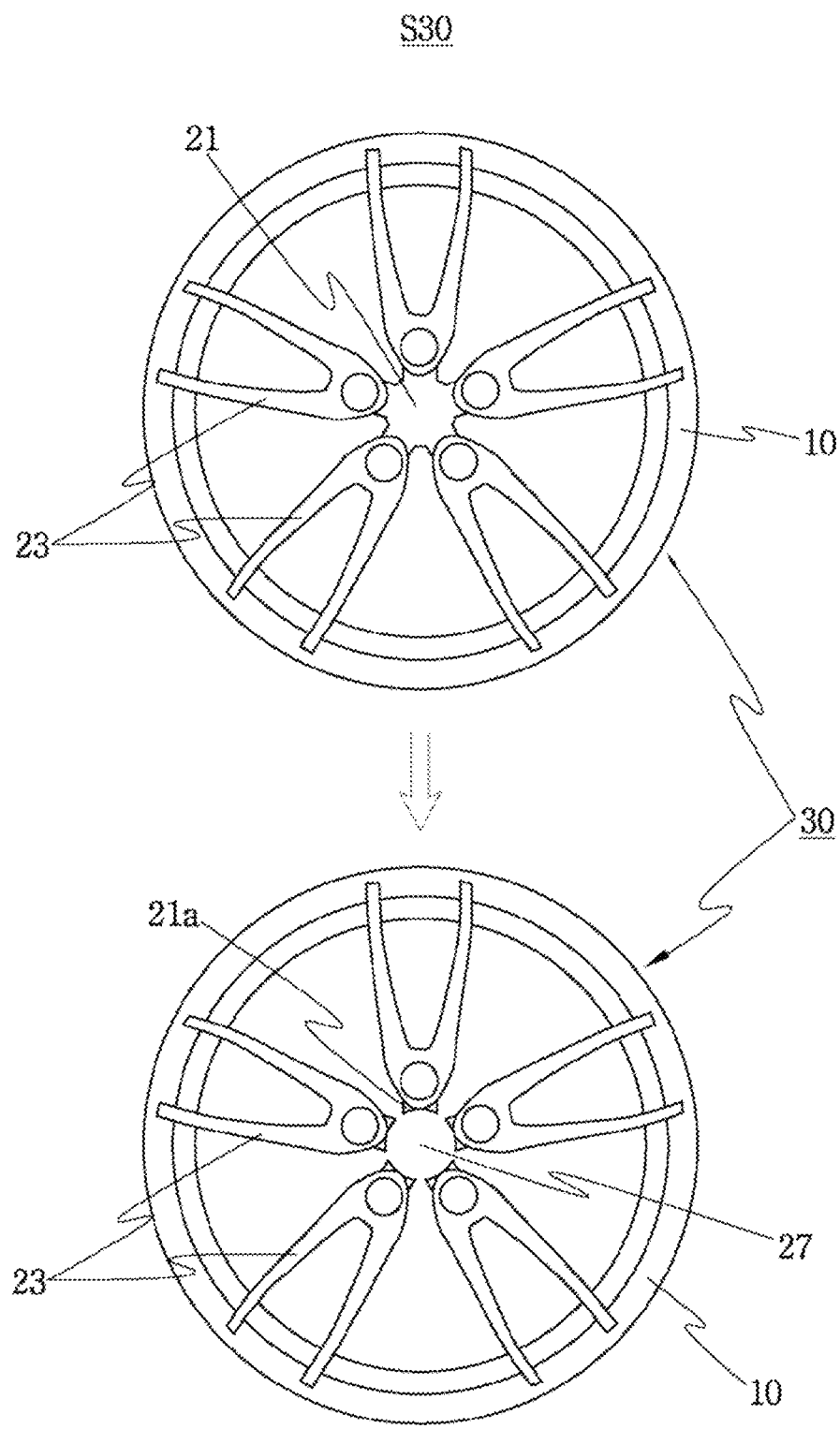
FIG. 4 is a view illustrating the state of disc-cutting of the present invention.
Figure 5:
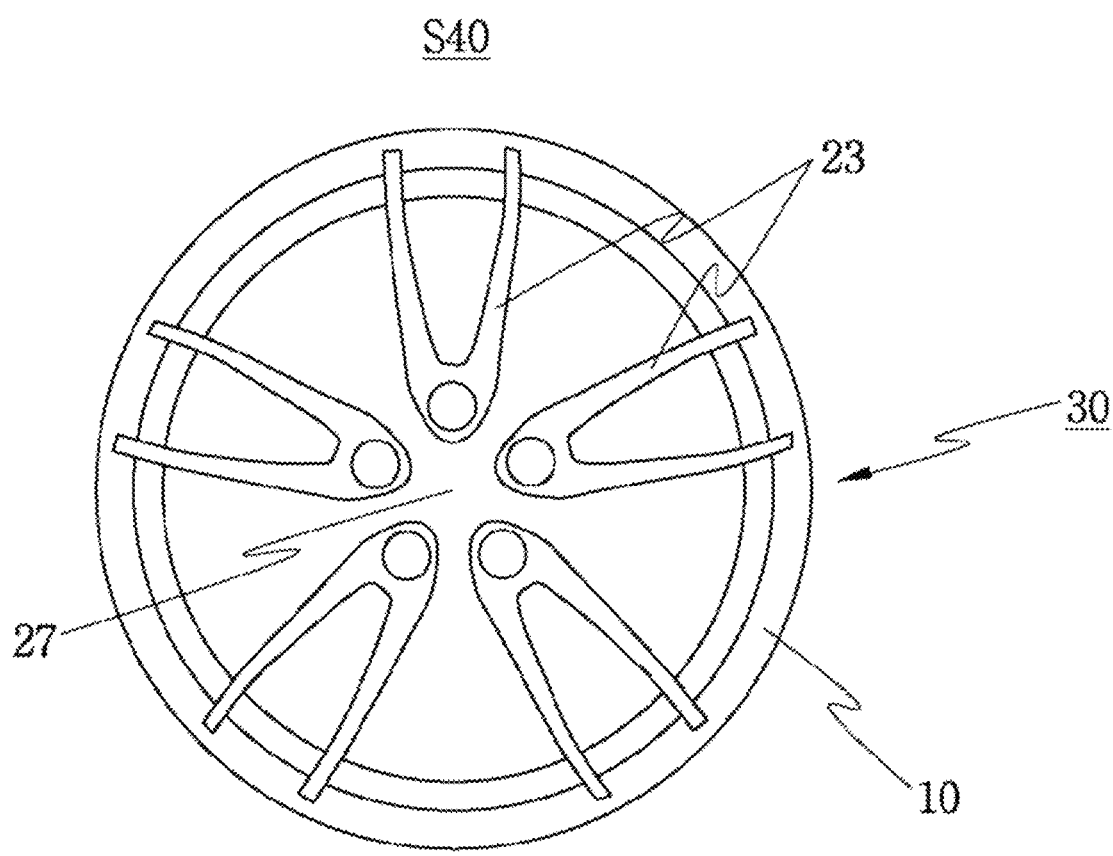
FIG. 5 is a view illustrating the state of disc-machining of the present invention.
Figure 6:
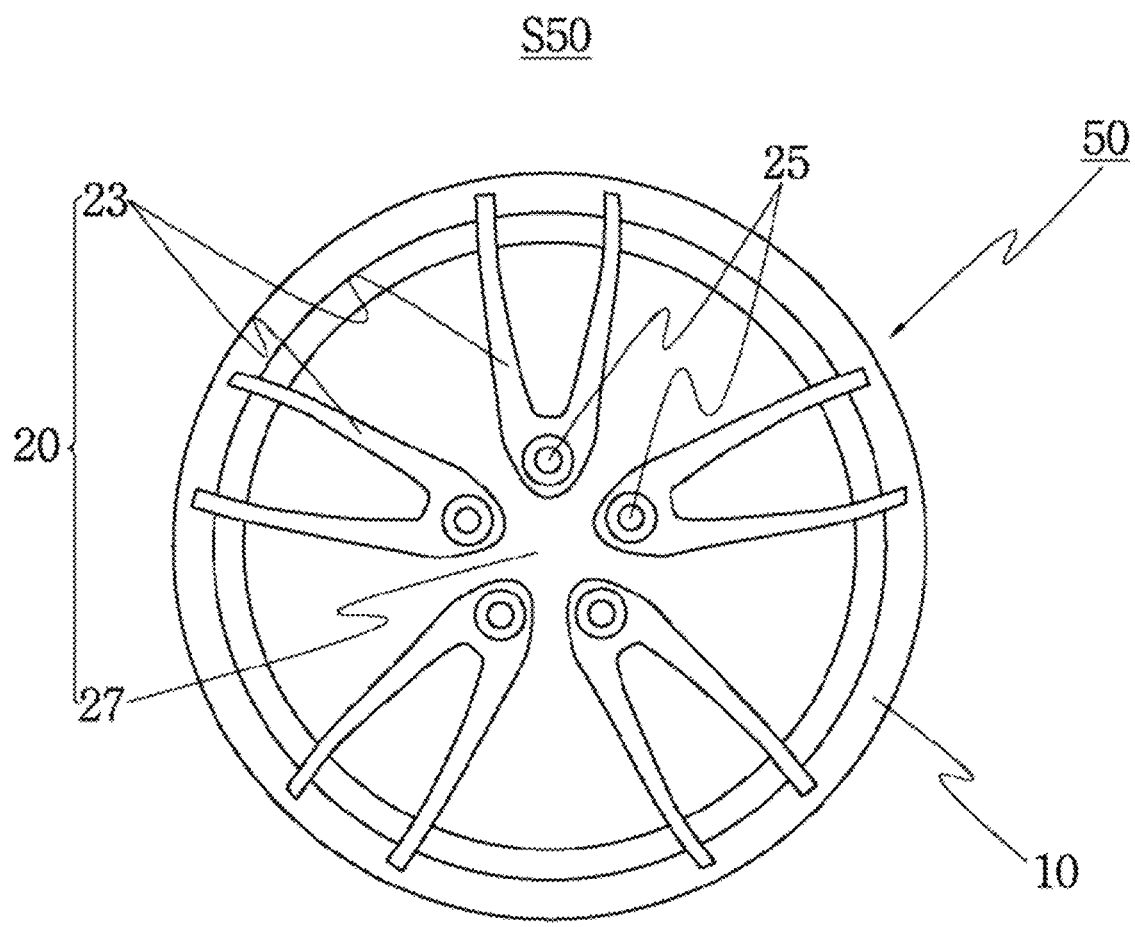
FIG. 6 is a view illustrating the state of forming a lug hole of the present invention.
Figure 7:
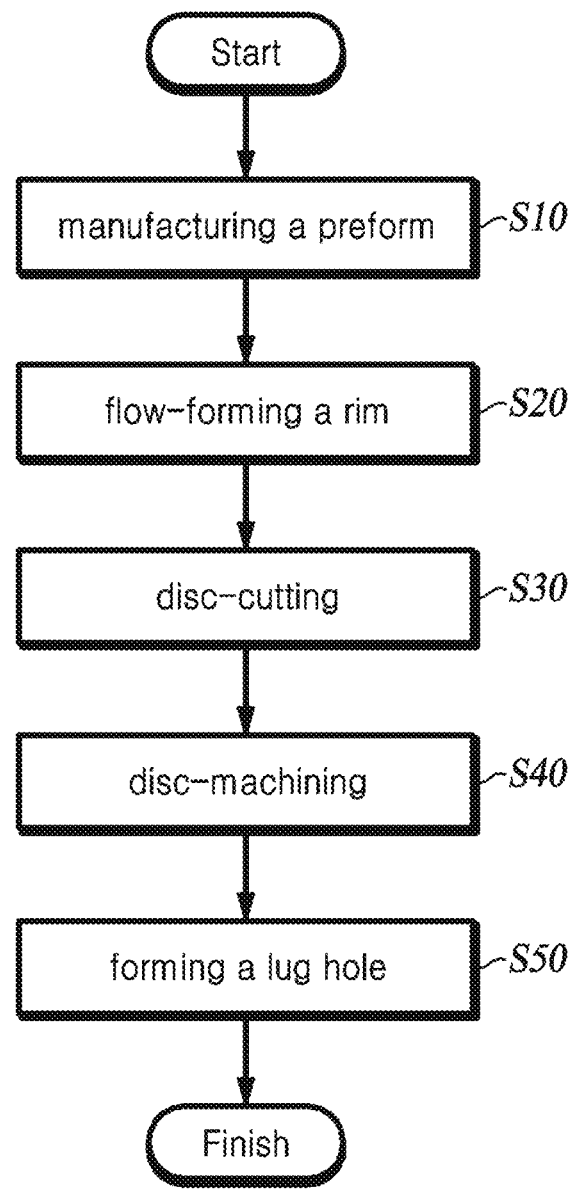
FIG. 7 is a flowchart illustrating a manufacturing method of the hubless one-piece wheel of the present invention.

1: thermally insulated furnace
9: low-pressure casting machine
9a, 9b, 9c: lower die, side die, upper die
10: rim
20: disc portion
21: riser
23: spoke
25: lug hole
27: space
30: preform
50: hubless one-piece type wheel

DETAILED DESCRIPTION

The configuration of the present invention for solving the above problems is as follows.

The present invention relates to a hubless one-piece wheel 50 having no hub on the disc 20 as shown in FIG. 1. The hubless one-piece wheel 50 is fabricated by forming a rim 10 and a disc 20 integrally formed on the rim 10 through low-pressure casting.

In general, one-piece wheels are fabricated by massive production and are installed to a vehicle in an automotive production line. Such wheels are made easy to fabrication and are easy to ensure rigidity with good quality control, but are hard to be made to be lightweight due to some technical aspects.

Thus, to solve such difficulties, the present invention is characterized in that the disc 20 is formed as a hubless type including a plurality of spokes 23 arranged radially toward the inside of the rim 10 and a space 27. One side of said each spoke 23 is integrally formed at the rim 10, and each of the other side of the spoke 23 located at the inner center portion of the rim 10 is separated by the space 27.

And a lug hole 25 is formed on the other side of said each spoke 23 for coupling the wheel 50 to an axle (not shown) of a vehicle body (not shown). The wheel 50 is configured as a hubless type in such way that the space 27 separates each of the other sides of the spoke 23 as described above so that the lack of a hub, which is typically formed in thick shape, not only can make the wheel lightweight without the extra step for removing molding sand but also can save molten metal, resulting cost- and time-saving in production.

As shown in FIGS. 1 to 7, the method for manufacturing a hubless one-piece wheel of the present invention is comprised the steps of manufacturing a preform S10, flow-forming a rim S20, disc-cutting S30, disc-machining S40, and forming a lug hole S50. A detailed description follows.

First, the manufacturing a preform S10 is a casting step for building a preform 30 by injecting molten metal from the thermally insulated furnace 1 through a fill stalk into the low-pressure casting machine 9 configured with the lower die 9a, side die 9b and upper die 9c.

To build the preform 30, it is preferable for the molten metal to be injected through the center of the lower die 9a and to be cast in low pressure. By being injected through the center of the lower die 9a, the injected molten metal in the low-pressure casting machine 9 spreads uniformly contacting the upper die 9c.

Thus, the molten metal distributed inside the low-pressure casting machine 9 begins directional solidification from the outer circumference of the rim 10 to the center of the preform 30 where the riser 21 is formed.

In addition, a plurality of spokes 23 being arranged radially around the circumference of the riser 21 is integrally formed, and the rim 10 is integrally formed at each one side of the spokes 23 where is the outer region of the spoke 23.

In addition, since the riser 21 formed in the step of manufacturing a preform S10 serves to form the spokes 23 and rim 10 except for a hub, the riser 21 can be thin according to the present invention. As less molten metal is required, cost and time for manufacturing can also be reduced.

Second, the flow-forming a rim S20 is a step for forming a rim 10 shape and increasing the strength of the rim 10 of the preform 30 from the previous step. The preform 30 is separated from the low-pressure casting machine 9 by disengaging the upper die 9c and side die 9b and transferred to perform the flow-forming of a rim 10 in the preform 30.

Forming a rim 10 continuously by the flow-forming using mandrel (not shown), rotating pressure chuck (not shown), and roller (not shown) is a known art, so a detailed description is skipped.

Optionally, pre-heating or pre-machining may be performed before flow-forming a rim 10. Typically, pre-heating by a heater (not shown) makes the forming of the rim 10 easier. And pre-machining of the inner surface of the rim 10 helps obtain more accurate geometry of the inner surface.

Third, the disc-cutting S30 is a step for separating the other side of the radially arranged spokes 23 after the flow-forming of the rim 10 by creating a space 27 introduced for removing the riser 21 located in the center of the disc 20.

In detail, the disc-cutting S30 separates each one of the other side of the spokes 23 located in the inner center portion of the rim 10 with each other by the space 27 formed by cutting through the riser 21 in the center of the disc 20 of the preform 30 using a conventional cutting machine (not shown).

The cutting machine may be a conventional sprue press machine that cutting is performed by lowering the blade with a cylinder.

Fourth, the disc-machining S40 is a step for machining the remaining protrusions 21a even after the cutting out the riser 21 by the disc-cutting S30.

The protrusion 21a is a residual portion of the riser 21, left unremoved after the disc-cutting S30 that separates each one of the other sides of the spokes 23 by removing the riser 21 by forming the through-formed space 27. The disc-machining S40 machines said protrusions 21a, rounding each one of the other sides of the spokes 27 formed by separation.

After the disc-machining S40, each separate one of the other side of the spokes 23 gets trimmed, so the disc 20 has a neat appearance.

Trimming of the protrusion 21a at each one of the other sides of the spoke 23 may be performed by a conventional machine tool (not shown) having a tool (not shown) such as an endmill installed to pass through the space 27 and arranged to rotate and move in the space 27.

Fifth, the forming a lug hole S50 is a step for forming a lug hole 25 at each spoke 23 to be assembled to an axle of the vehicle. The conventional drilling operation is performed to form a lug hole 25 at each one of the other sides of the spoke 23 in the preform 30, finalizing the production of the hubless one-piece wheel 50 according to the present invention.

Moreover, after all the above-described steps are performed, it is preferable to take further typical steps such as heat treatment, precision machining, deburring, coating, inspection, etc. in sequence to ensure the final quality of the product.

On the other hand, the applicant has compared the weights of the conventional wheel and the hubless one-piece wheel of the present invention using the in-house equipment.

Figure 8:
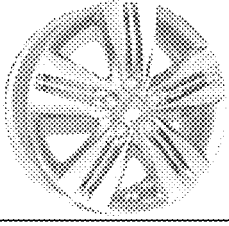
FIG. 8 is a chart comparing weights of a conventional wheel with the hubless one-piece wheel of the present invention.
Figure 8:
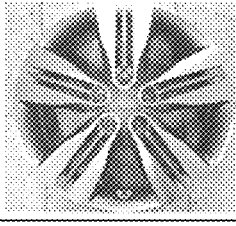

As a result, as shown in FIG. 8, it was identified that the weight of the hubless one-piece wheel of the present invention is reduced by about 500 g compared with the conventional wheel, which equals a weight reduction by 4.26%.

In the following analysis, durability tests of the hubless one-piece wheel of the present invention using each dedicated test equipment of the applicant are described.

Figure 9:
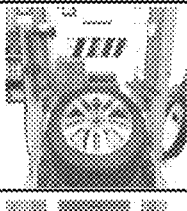
FIG. 9 is a chart of an impact test of the wheel of the present invention.
Figure 9:
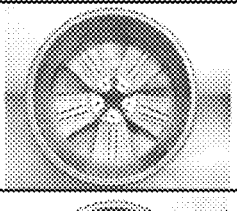
Figure 9:
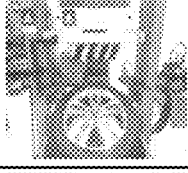
Figure 9:
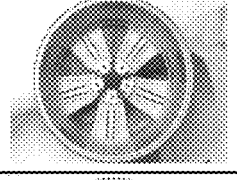
Figure 9:
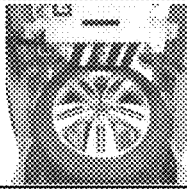
Figure 9:
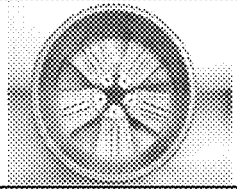

Foremost, an impact test of the hubless one-piece wheel of the present invention is shown in FIG. 9. The impact is applied to the spokes of the hubless one-piece wheel of the present invention fitted with a tire, and the wheel is assembled to a test axle corresponding to the axle of the vehicle through lug holes.

The hubless one-piece wheel of the present invention has passed all impact tests and was identified to have enough durability. The impact test was done with normal impact condition of 540 kg and extreme impact conditions of 590 kg and 620 kg beyond the working limit of the wheel.

In addition, a rotational bending durability test of the hubless one-piece wheel of the present invention is shown in FIG. 10. The wheel was assembled to the test axle corresponding the axle of the vehicle through the lug holes, then the assembly was fastened to a rotation plate using a fastener, and then a bending moment of 324 kgf·m was given by applying a lateral force on one side of the test axle.

Then, by rotating the rotation plate with the assembly fastened including the wheel of the present invention, rotational bending durability was tested letting the hubless one-piece wheel of the present invention repeatedly receive the bending moment of 324 kgf·m at the inner portion via the test axle.

The hubless one-piece wheel 50 of the present invention has passed all tests and was identified to have enough rotational bending durability. The rotational bending durability test was done with normal test cycle of 200,000 and with extreme conditions of 300,000 and 400,000 cycles.

Figure 11:
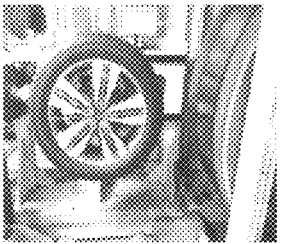
FIG. 11 is a chart of a radial load durability test of the wheel of the present invention.
Figure 11:
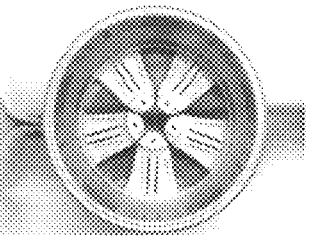
Figure 11:
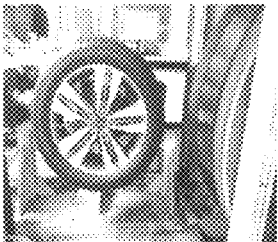
Figure 11:
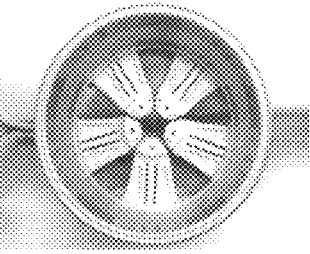

In addition, a radial load durability test of the hubless one-piece wheel of the present invention is shown in FIG. 11. The wheel of the present invention fitted with a tire was assembled to the test axel corresponding to the axle of the vehicle via lug holes; then the wheel was given 1350 kgf load through the tire by bringing the tire in close contact with a rotating object.

Then, the load of 1350 kgf was repeatedly applied by the rotating object to the hubless one-piece wheel.

The hubless one-piece wheel 50 of the present invention has passed all radial load durability tests and identified to have enough radial load durability. The radial load durability test was done with normal 2 million cycle condition and with extreme 3 million cycle condition.

TABLE 1

| Test item | | Impact test | Rotational bending durability test | radial load durability test |
|---|---|---|---|---|
| | Guide | Max. Strain 10% | Max. Stress 151.7 Mpa | Max. Stress 115.2 MPa |
| 15 inch 4 hole | Hubless one-piece wheel | 7.8 (↑) | 137.65 (↑) | 98.66 (↑) |
| | Conventional one-piece wheel | 8.9 | 142.08 | 105.74 |
| 16 inch 4 hole | Hubless one-piece wheel | 6.2 (↑) | 110.13 (↑) | 73.48 (↑) |
| | Conventional one-piece wheel | 8.8 | 113.06 | 89.61 |
| 18 inch 5 hole | Hubless one-piece wheel | 9.04 (↑) | 150.12 (↓) | 113.2 (↓) |
| | Conventional one-piece wheel | 12 | 146.97 | 109.55 |

In addition, above Table 1 describes a durability test comparison of conventional wheels with the hubless one-piece wheels of the present invention. All tests were passed such as impact test, rotational bending durability test, radial load durability test. Among the results, the hubless one-piece wheels were identified to have better impact durability characteristics than the conventional wheels.

The hubless one-piece wheels are having comparably smaller diameters of 15, 16 inches were identified to have somewhat better durability in the rotational bending and the radial load than the conventional wheels.

For the 18-inch wheel having a comparably larger diameter, both the conventional wheels and the wheels of the present invention have equivalent durability performances.

As described above according to the present invention, the wheel can be produced lightweight without sacrificing durability, and the cost and time of manufacturing can also be reduced as it requires less amount of molten metal. The overall process of manufacturing can also be efficient.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

The invention claimed is:

1. A hubless one-piece wheel, comprising:
   a rim, a disc integrally formed with the rim, wherein the rim and the disc are formed by a low-pressure cast;
   wherein the disc is hubless and includes:
      a plurality of spokes arranged radially inside the rim, a first end of each one of the plurality of spokes is integrally formed at the rim; and
      a space formed at an inner center portion of the rim where a second end of each one of the plurality of spokes is disposed, the space separates the second end of each one of the plurality of spokes from each other;
   wherein each one of the plurality of spokes defines a lug hole configured to be assembled into a vehicle.

2. A manufacturing method for a hubless one-piece wheel, comprising:
- manufacturing a preform having a wheel shape including a riser, a plurality of spokes integrally formed and radially arranged around the circumference of the riser, and a preform rim integrally formed and connected at a first end of each one of the plurality of spokes by pouring molten metal stored in a thermally insulated furnace into a low-pressure casting machine;
- flow-forming the preform rim of the preform to provide a final rim of the wheel;
- disc-cutting the riser of the preform so that a space is formed inside the center of the preform and each one of the second ends of the plurality of spokes located in the central portion of the wheel are separated from each other;
- disc-machining protrusions formed at the second ends of the plurality of spokes to round each one of the second ends; and
- forming a lug hole at each one of the second ends of the plurality of spokes formed in the preform.

\* \* \* \* \*